United States Patent

Howe

[15] 3,694,949
[45] Oct. 3, 1972

[54] ANIMAL IDENTIFICATION TAG AND INSTALLATION TOOL THEREFORE

[72] Inventor: Clarence H. Howe, 1925 Newton Ave., Cody, Wyo. 82414

[22] Filed: Jan. 29, 1970

[21] Appl. No.: 6,705

[52] U.S. Cl. ................................................40/301
[51] Int. Cl. ............................................A01k 11/00
[58] Field of Search ...............................40/300–302

[56] References Cited

UNITED STATES PATENTS 3,512,289  5/1970  Hayes..........................40/301
3,526,987  9/1970  McCarty et al...............40/301

Primary Examiner—Robert W. Michell
Attorney—Van Valkenburgh and Lowe

[57] ABSTRACT

A tag and a tool for installing the same, the tag having a generally flat, elongated blade member with a hole near the lower end which fits onto a forwardly slanted pin upstanding from the cutting end of the tool, which makes a curved slit, with the curve facing upwardly, in an ear or the brisket or flank of the animal. The tool is thrust quickly through the ear, to pull the blade member with it through the slit, then the tool is quickly withdrawn from the same side of the ear. The blade member of the tag and a body member are connected by a flat, S-shaped yoke, with the upper end of both the blade member and the body member spaced above the yoke. The tool has a clamping section beneath which the body member of the tag is placed, to hold the blade member extending rearwardly along the tool. As the blade member passes through the slit, its upper end will engage the far side of the ear. The tag yoke has an elongated central section and bars connecting with the blade and body members with rounded corners between and the upper bar remaining in the slit. The flat yoke permits quick healing of the slit, while the central section of the yoke and also the upper rounded corner, permit considerable movement of the tag body, without disturbing the yoke bar within the ear. The body of the tag also has, adjacent the lower end, a T-shaped connector for a larger auxiliary tag, which may be marked on both sides, and extends below the ear. The tool has an upstanding post having a slot in which a side of the T-connector may be held, for forcing a hole in the auxiliary tag onto the T-connector.

11 Claims, 13 Drawing Figures

PATENTED OCT 3 1972

INVENTOR.
Clarence H. Howe
BY
Van Valkenburgh & Lowe
ATTORNEYS

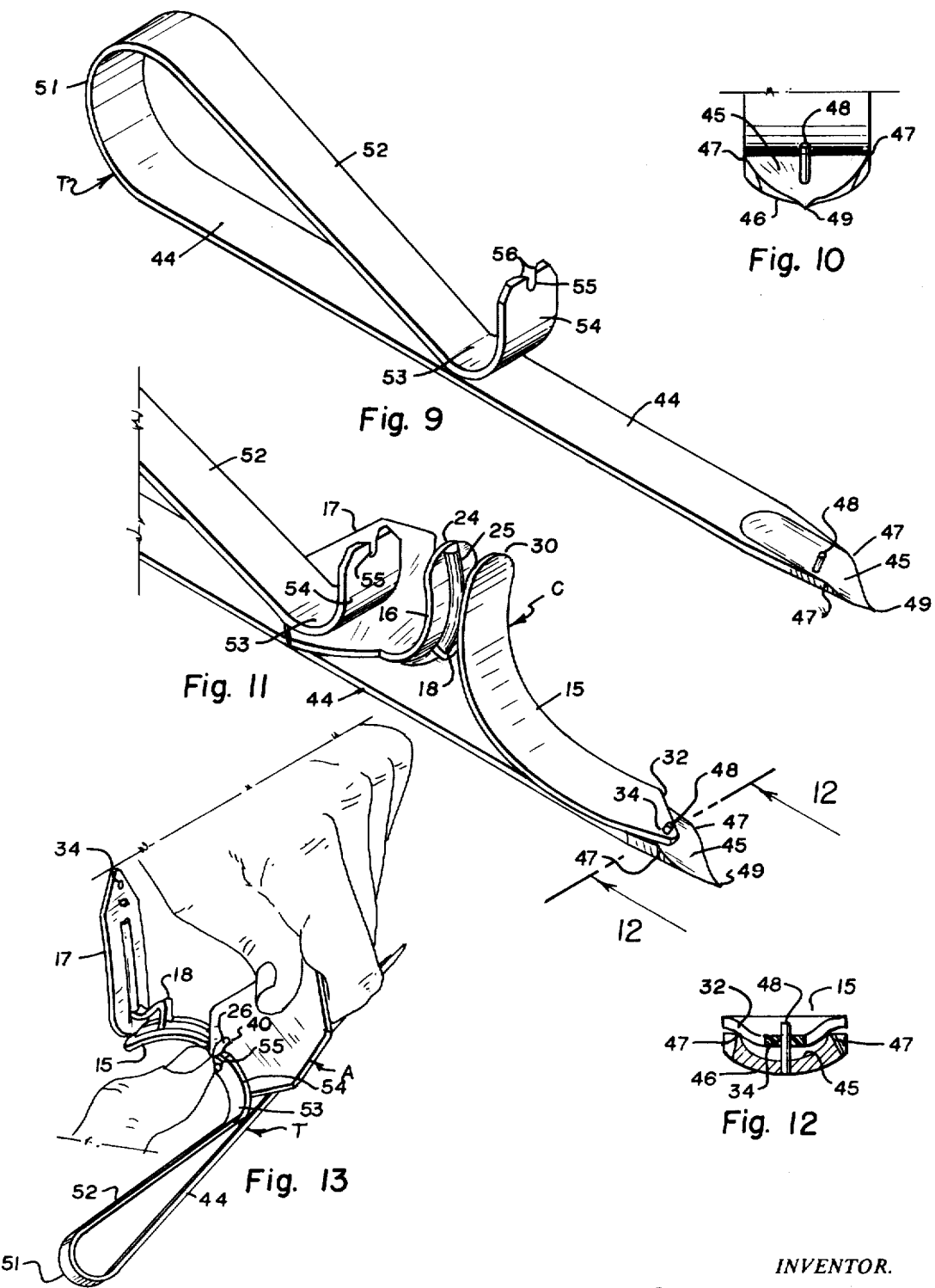

3,694,949

ANIMAL IDENTIFICATION TAG AND INSTALLATION TOOL THEREFORE

This invention relates to animal identification tags, and particularly such tags and installation tools therefor, as well as connector tags which are adapted to suspend an auxiliary tag.

Animal identification tags are utilized to identify individual animals, and are particularly useful for record keeping purposes. Such tags are normally placed in the lower part of an ear of an animal, such as a steer, although tags may also be placed in the brisket or flank. Such a tag may be marked on one side only, as with a number or other type of indicia, although it is often preferable to mark the tag on both sides, so that when suspended from the ear, the indicia may be seen from positions to both the front and rear of the animal. In the case of animals which are maintained in a relatively restricted space, marking on one side of the tag only is normally sufficient, but for range animals, which may require identification from a greater distance, a tag suspended for the ear and marked on both sides is normally preferably. Identification tags of various and sundry types have been known. In one highly popular type, an enlarged marking area is connected by a narrower strip or neck with a socket adapted to cooperate with a pin having a conical point, which is pushed through the ear by a special tool for engagement with a socket. However, such tools are quite expensive and the pins, because they must necessarily produce a hole in the ear, are formed of quite hard material and are also round, thereby tending to wear the hole in the ear, when the animal, such as range cattle, who have a greater opportunity to do so, encounters brush, tree limbs, fence wires and the like, with the result that, sometimes the head of the pin pulls through the ear and the tag is lost. Nevertheless, an advantage of such pins is that only the pin passes through the ear and sterilization of the tool is unnecessary. Certain other types of identification tags require a knife or other sharp instrument to be used in producing a slit in the ear, through which the tag is pulled, and then arranged on each side of the ear. The disadvantage of such a type of installation is that if the animal, particularly a steer, tends to toss its head or kick at the installer, when the ear is slit, it may be difficult at times to keep the animal quiet until the tag can be pulled through the slit in the ear.

Among the objects of this invention are to provide a novel combination of an animal identification tag and a tool for installing the same; to provide such a combination in which the tool produces a slit in the ear and pulls a portion of the tag through the slit with it, with the tool being withdrawn from the same side of the ear, so that the installation procedure is very quick and effective, requiring merely a thrust of the tool through the ear and immediate withdrawal of the tool; to provide such a combination in which the portion of the tag pulled through the ear is readily released from the tool upon the rearward motion thereof; to provide a novel identification tag which is provided with a member which may be pulled through a slit in an ear or the like of an animal, either manually or by a tool; to provide such a tag having such a member which will automatically engage the opposite side of the ear, when the tool is withdrawn; to provide such a tag which is sufficiently flexible that it will neither by itself damage nor cause damage to the ear, when the animal encounters an obstruction; to provide such a tag which is strong and durable; to provide such a tag which includes a member which may be positioned on one side of the ear and a body which may be placed on the opposite side of the ear, with the member and body connected by a yoke, a portion of which remains in the ear; to provide such a tag having such a yoke which is especially flexible and thereby permits the tag body to be moved around, as by an encounter with an obstruction; to provide such a tag to which an auxiliary tag, such as having a larger area for identification marks, may be attached, so as to be suspended from the ear and the identification marks thereby being visible from both the front and rear of the animal; to provide such a tag having such a member and body which extend above the yoke; thereby effectively retaining the tag in the ear; to provide such a tag having such a yoke provided with an elongated section which permits the body of the tag, as to which an auxiliary tag is connected, to be moved around considerably without material disturbance of the position of the portion of the yoke in the ear, thereby permitting the ear to heal rapidly and preventing the aperture in the ear from becoming enlarged; to provide such a tag having such a member and a body connected by a yoke, with the member and body extending a sufficient distance, both above and below the yoke, that there is little danger of either the member or the body being pulled through the ear; to provide a novel tool for installing a tag of this invention; to provide such a tool having means for producing an upwardly curved slit in the ear and a tag engaging element adjacent the slit producing means; to provide such a tag having a releasable clamping device for holding a portion of the tag in position along the tool, for installation; to provide such a tag having, adjacent one end thereof, means for releasably receiving the tag engaging element; to provide such a tool which is also particularly useful in attaching an auxiliary tag to the aforesaid tag; to provide such a tool which is simple in construction and inexpensive to manufacture; and to provide such a tool and such a tag and a combination thereof which is effective and efficient in use.

The foregoing and additional objects of this invention, as well as the novel features thereof, will become apparent from the description which follows, taken in conjunction with the accompanying drawings, in which:

FIG. 9 is a perspective view of an installation tool, constructed in accordance with this invention and particularly adapted to be used in installing the connector tag of this invention;

FIG. 10 is a fragmentary front view, showing particularly the front end of the tool of FIG. 9;

FIG. 11 is a fragmentary perspective view, similar to FIG. 9 but showing the tag of FIG. 2 placed in position on the tool, for installation of the tag;

FIG. 12 is a transverse section, taken along line 12—12 of FIG. 11; and

FIG. 13 is a perspective illustration of the use of the tool of FIG. 9 in attaching the auxiliary tag to the connector tag.

Figure 1:
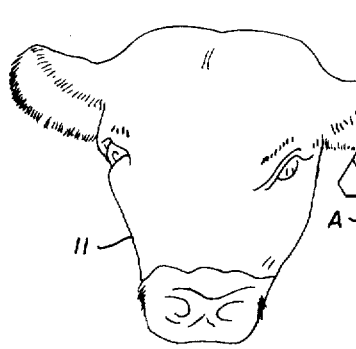
FIG. 1 is a front perspective view, on a reduced scale, of the head of an animal, to an ear of which are attached a connector tag and an auxiliary tag constructed in accordance with this invention.
Figure 4:
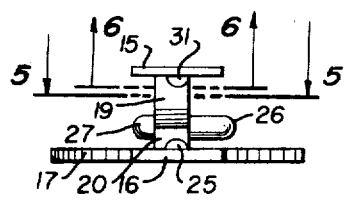
FIG. 4 is a top plan view of the connector tag of FIG. 3.
Figure 2:
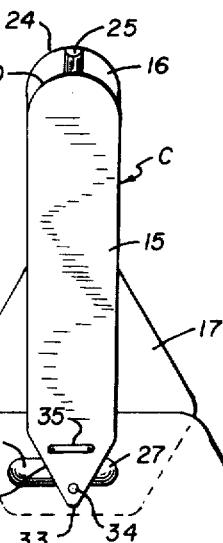
FIG. 2 is a fragmentary section, on an enlarged scale and taken along line 2—2 of FIG. 1, showing the tag as installed in the ear of an animal.

As shown in FIG. 1 of the drawings, a connector tag C, from which an auxiliary tag A depends, may be attached to an ear 10 of an animal 11, such as a steer, calf, cow or the like. It will be understood, of course, that the connector tag C, with or without the auxiliary tag A, may be installed in another portion of the animal's body, such as in the brisket, at the front, or in the flank, at the rear. Through use of the tool T of FIG. 9, the connector tag C may be installed in the ear, brisket or flank by a simple thrust of one end of the tool through the ear and an immediate return of the tool, from the same side of the ear. In general, indicia may be placed on the connector tag C, although for many purposes, the auxiliary tag A is provided with indicia on both sides and is suspended from the connector tag C, to depend below the ear, so as to be visible from either the front or rear of the animal. Each of the connector tag C and the auxiliary tag A are conveniently molded from a suitable tough but resilient plastic, such as a polyurethane, or any other suitable material. The tags C and A may be the same color or different colors, with each made of a variety of colors and of a material on which indicia may be placed by a felt tipped marking pen or the like, using an ink of a contrasting color. Both the connector tag C and the auxiliary tag A may be made in different sizes for calves, sheep and cattle, intermediate sizes for calves, sheep and swine and smaller sizes for lambs. As in FIG. 2, a slot 12 is produced in the ear by the tool T, as in the manner hereinafter described, the slit being curved and facing upwardly and the top of the slit being indicated by the dotted line 13, thereby producing a flap 14 which provides a momentarily enlarged hole for passage of a blade member 15 of the connector tag C, which is pulled through the slit by the tool, which is immediately withdrawn as soon as the top of the blade member 15 reaches the far side of the ear. The withdrawal of the tool causes the blade member 15 to closely engage the far side of the ear, as shown, while a body 16 of the connector tag C remains on the near side of the ear, with auxiliary tag A suspended from it.

Figure 3:
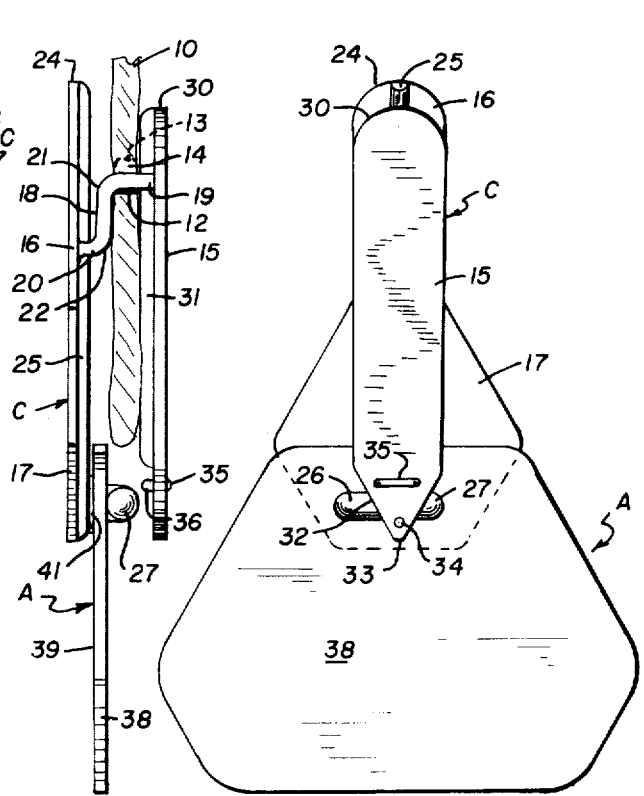
FIG. 3 is a side elevation of the connector tag and auxiliary tag of FIG. 2, looking toward the rear thereof.
Figure 5:
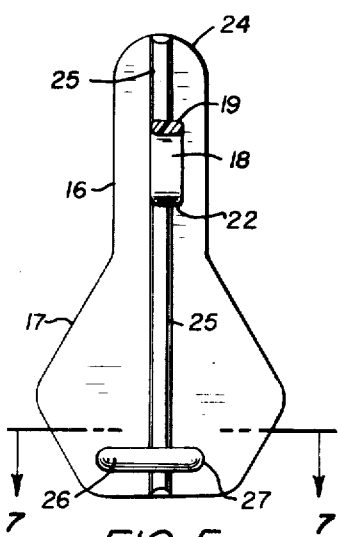
FIG. 5 is a vertical section, taken along line 5—5 of FIG. 4, looking toward the inside of a body of the tag.
Figure 6:
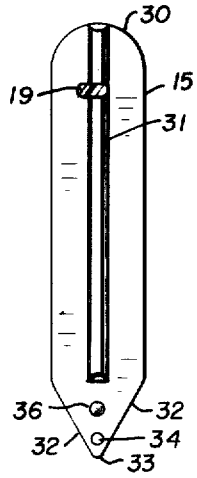
FIG. 6 is a vertical section, taken along line 6—6 of FIG. 4, looking toward the inside of a blade member of the tag.
Figure 8:
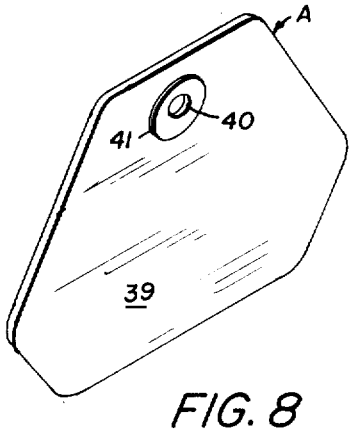
FIG. 8 is a front perspective view of the auxiliary tag of FIG. 2.

The body 16 of the connector tag C is spaced from the blade member 15, the lower portion 17 of the body 16 being enlarged, as in FIGS. 3 and 5, as to a generally hexagonal shape, so that desired indicia may be placed on the front surface thereof, as when the connector tag C is to be utilized without the auxiliary tag A. The blade member 15 and body 16 are connected by a yoke 18, the normally upright central section of which is elongated and connected at its upper end to the blade member 15 by a longer bar 19, which remains in the ear and provides sufficient spacing between the central section of the yoke 18 and the blade member 15 to accommodate the ear. The lower end of the central section of the yoke is connected to the body 16 by a shorter, lower bar 20. The yoke 18 is preferably flat and ribbon-like, with the elongated, upright central section thereof being connected to the bars 19 and 20 by rounded corners 21 and 22, respectively, for a purpose hereinafter described.

The flat, ribbon-like structure of the yoke 18, and particularly the rounded corner 21, provides sufficient flexibility that the body 16 may be moved bodily upwardly and outwardly from the ear, as when encountering an obstruction, without disturbing the position of the longer bar 19 in the ear, thereby promoting the healing of the slit 12 and also preventing an enlargement of the hole through the ear during use. The central section of the yoke may also twist, as when body 16 and/or auxiliary tag A are twisted, so that again the longer bar 19 in the ear is undisturbed. In the event the lower end of body 16 is merely moved away from the ear, as by an obstruction, the upper ends of blade member 15 and body 16 will clamp the ear between them.

The upper end 24 of the body 16 may be rounded, as in FIGS. 3 and 5, to reduce the possibility of the upper end of the body snagging on obstructions, while the body may be reinforced by a central longitudinal rib 25, as in FIG. 5, to impart enough rigidity to the body that it will retain its shape during use and will provide the clamping effect described above. Adjacent its lower end, the body may be provided with a transverse, T-shaped connector, comprising a generally cylindrical bar having a longer side 26 and a shorter side 27, each with rounded ends and attached in spaced relation to the body by a neck 28, to which the auxiliary tag A is, in turn, connected.

The blade member 15 may be provided with a rounded upper end 30 and a central longitudinal stiffening rib 31 which terminates short of the lower end of the body, which has tapered sides 32 merging into a blunt point 33. Adjacent the blunt point at the lower end of the body is a transverse hole 34 which cooperates with the tool T, in a manner hereinafter described, to permit the tool to pull the blade member 15 through a slit in the ear produced by the tool. Above the hole 34, the blade member 15 is provided with a lateral rib 35, on one side, and with a similar rib or a projecting or nipple 36, on the opposite side. In the event that the tool T of FIG. 9 is not available, the tag may still be installed by making a slit in the ear with a knife, inserting the lower end of the blade member 15 through the slit and then pulling the blade member through the slit, as by the user grasping the rib 35 and projection 36 with the thumb and forefinger of one hand. It will be understood, of course, that the preferred method of installation is through the use of the tool T.

Figure 7:
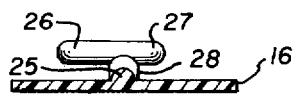
FIG. 7 is a cross section, taken along line 7—7 of FIG. 5.

The auxiliary tag A may have any suitable shape, such as generally hexagonal, as shown, and opposite faces 38 and 39 on which the desired indicia may be placed, as by a marking pen. The auxiliary tag A is also provided with a hole 40 and an integral reinforcing boss 41 surrounding the hole, on either one side, as shown, or on both sides. For attachment of the auxiliary tag A to the connector tag C, the hole 40, which has a diameter corresponding to that of neck 28 of FIG. 7, is pushed onto the longer bar side 26 and then stretched over the shorter bar side 27 into engagement with neck 28, so that the auxiliary tag A may be suspended from the connector tag C, as in FIG. 2.

The tool T, as in FIG. 9, may include a flat, elongated blade 44 having a width corresponding to the blade member 15 of the connector tag C, with the front end of blade 44 being offset, as by stamping, to form a trough 45 having a curved surface 46 on the underside and a wing 47 at each side of the trough. A tag engaging element, such as a pin 48, is mounted centrally of trough 45, so as to upstand from the trough but slant forwardly, as by being inserted in a hole in the blade and then brazed or welded thereto. The inner end of the tool is also formed, as by grinding, to provide a sharp front point 49 and sharpened edges along each wing 47, so that when thrust through the ear, the tool will produce an upwardly facing, curved slit, i.e., the curved slit 12 of FIG. 2 having each end 13 higher than the center. As indicated previously, this produces a flap 14 which is forced out of the way by insertion of the tool and the blade member 15, but will be returned to engage the longer arm 19 of the yoke, when the tool is withdrawn and the blade member 15 is pulled back against the ear.

The tool blade 44 is conveniently integral with a semicircular rear end 51, in turn integral with a handle section 52 which slants downwardly toward the blade to a curved clamping section 53, in turn integral with an upstanding post 54 in the outer end of which a notch 55 having beveled edges 56, as on one side, is provided. The rear end of the blade 44 and the handle section 52 provide a handle by which the tool may be readily grasped by the installer, for thrusting the tool through the ear and also pulling it back. If the auxiliary tag A is to be used, it is preferably attached to the connector tag C prior to mounting on the tool. For mounting the connector tag C on the tool, as shown in FIG. 11, the hole 34 in the end of blade member 15 is forced onto pin 48, as in FIG. 12, the diameter of hole 34 being preferably slightly less than the diameter of pin 48, and the blade member 15 then positioned alongside the tool blade 44. By pulling rearwardly on the body 16, the blade member 15 may be stretched along the tool blade and the edge of the marking enlargement 17 of the blade member pushed rearwardly between the tool blade 44 and the clamping section 53, so as to hold the tag in approximately the position of FIG. 11. As will be evident, with the tag mounted on the tool in the position of FIG. 11, the yoke 18 pulls the blade member 15 of the tag back along the tool blade 44. Also, when the auxiliary tag A is connected to the body 16 of the connector tag C, it will merely hang at one side of the tool during installation. The tension in connector tag C at pin 48, produced by stretching the tag rearwardly and clamping it under clamping section 53 maintains the tag on the tool, as when the tag is marked and mounted on the tool but the operator is not quite ready to use it, or perhaps accidentally drops it. The rear end 51 permits the tool, or the tool with a tag mounted on it, to be hung on a nail, hook or the like, for convenience.

When the tool is thrust through the ear, the point 49 first passes through the ear, with the wings 47 producing the upwardly facing arcuate slit previously described. Through engagement of hole 34 with pin 48, the tag blade member 15 will be pulled into the slit by the tool, the upper portion of the blade member 15 being pushed down against the blade, during further movement of the tool through the slit. As soon as the rounded upper end 30 of the blade member 15 passes through the slit and reaches the far side of the ear, with the center section of yoke 18 entering the slit but being withdrawn as the tool is withdrawn, the inside of the body 16 will abut the near side of the ear, at which time the tool may be withdrawn from the ear from the near side, i.e., the same side from which it was thrust through the ear. This is a particular advantage of the present invention, since the return of the tool may be started simultaneously with the end of the thrust through the ear and the tag will be installed before the animal has sufficient time to react to the installation of the tag. Thus, both the thrust and return of the tool are made as rapidly as possible. As the tool is withdrawn from the ear, the center section of yoke 18 will move out of the slit and bar 19 will occupy the slit, while the inside of blade member 15 above yoke 18 is restrained by engagement with the far side of the ear and the front end of the blade member 15 will move forwardly along the tool blade, thus reversing the tension at hole 34 on pin 48 and causing the hole to snap off the pin, assisted by the forward inclination of the pin. Thus, when the tool has completed its withdrawal from the ear, the blade member 15 will have moved back against the ear to reposition the flap 14, which has been thrust forwardly by entrance of the tag blade member 15. Also, as the tool is withdrawn from the ear, the tag body 16 will be pulled from beneath the clamping section 53 of the tool. These events, of course, happen with considerable rapidity, but the ultimate result is that the tag will be installed in the ear in the position of FIG. 2, with the portion of the ear below the slit between the central upright section of yoke 18 and the tag blade member 15. The cutting end of the tool blade is preferably dipped into a sterilizing solution, between each use, in order to prevent possible infection of any animal or spread of a blood infection or other disease from one animal to another.

As indicated previously, the auxiliary tag A may be installed on the neck 28 by forcing the hole 40 of the auxiliary tag over the longer bar side 26 and then stretching the hole 40 over the shorter bar side 27. Since the stretching of the hole 40 over the shorter bar side 27 will normally require considerably more force than pushing the hole 40 over the longer bar side 26, the slot 55 of post 54 may be utilized in the latter operation. Thus, as illustrated in FIG. 13, after the auxiliary tag hole 40 has been pushed over the longer bar side 26 up to the neck 28 of FIG. 7, the longer bar side 26 may be wedged into the slot 55 and held in that position by the thumb of one hand of the user pushing against the extended end of the longer bar side 26. The handle end of the tool, of course, may be grasped by the fingers of the same hand. When in this position, the other hand is used, as shown, to pull the hole 40 of the auxiliary tag over the shorter bar side 27, so that the hole 40 will then engage the neck 28. Although it normally requires considerable force to force the hole in the auxiliary tag A onto the attaching neck of the connector tag C, this is actually an advantage, since it will then require as much force to cause the auxiliary tag A to be separated from the connector tag, as by becoming wedged between two overlapping boards of a farm or ranch building or becoming caught in a sheep or hog wire fence.

From the foregoing, it will be evident that the tag and tool of this invention fulfill to a marked degree the requirements and objects hereinbefore set forth. Through use of the tool T, the connector tag C, with auxiliary tag A attached to it, if desired, is readily installed in an animal's ear, brisket or flank by a rapid thrust of the tool and an equally rapid return movement. There are no parts of the tag which require repositioning or adjustment after installation. Through the use of the tag engaging element on the tool, between the cutting edges at the front of the tool, and means on the tag for releasably engaging the tag engaging element, a blade member of the tag is readily pulled through a slot in the ear, as made by the tool, and the blade member automatically is separated from the tool, upon the withdrawal of the tool, from the same side of the ear. The S-shaped yoke, which connects the blade member and body of the tag, is provided with a flat upper bar which remains in the ear and is longer, so as to accommodate the ear and also promotes healing of the slit in the ear, as well as resisting twisting, to minimize the possibility of the hole becoming enlarged during use. The yoke further permits the body of the connector tag, with or without the auxiliary tag attached to it, to be moved bodily away from the ear or twisted about, without disturbing the position of the upper bar in the ear. The rounded corner between the upright, elongated central section of the yoke and the longer upper bar provide additional flexibility, to accommodate movement of the body and auxiliary tag relative to the ear. Of course, if the lower end of the tag is moved directly outwardly from the ear, the ear will be clamped between the upper end of the body and the upper end of the blade member, each of which extends above the upper end of the yoke. The tool is not only useful in producing a slit and pulling the blade member of the tag through the ear, but the clamping section of the tool holds the tag in a stretched position, thereby not only facilitating the installation of the tag, but also essentially prevents the tag from becoming dislodged from the tool prior to installation. In addition, the tool post having a slot at the upper end assists in attaching the auxiliary tag to the T-shaped connection of the connector tag, the force required to attach the auxiliary tag to the connector tag being a distinct advantage, since as much force will be required to accidentally disconnect the auxiliary tag.

Although preferred embodiments of the tool and tags of this invention have been illustrated and described, it will be understood that other embodiments may exist and that various changes may be made, all without departing from the spirit and scope of this invention.

What is claimed is:

1. In the combination of an animal identification tag and a tool for installing the same in an ear or the like of an animal, wherein:

said tool is provided with a substantially flat blade having converging cutting edges at one end and upstanding pin means adjacent said cutting edges;

said tag is provided with a substantially flat member adapted to be pulled by said tool through a slit in said ear or the like made by said cutting edges and then to engage the opposite side of said ear;

said member has adjacent one end thereof a hole for releasable receiving said pin means;

said tag has a yoke connecting said member with the remainder of said tag, a portion of said yoke being adapted to remain in the slit in said ear or the like; and said tool is provided with means for engaging a portion of said tag, at a position spaced from said hole, to hold said member along said blade;

whereby said member may be attached to said tool through interengagement of said pin and said hole with said member extending along said tool away form said cutting edges, said tool blade may be thrust through said ear or the like from one side to pull said member through said ear and cause said member to engage the opposite side of said ear and said tool blade may be immediately withdrawn from said one side.

2. An animal identification tag, as defined in claim 1, wherein:

said pin means extends forwardly.

3. In the combination of claim 1, wherein:

said tag is provided with a body connected to said member by said yoke;

said yoke is connected to said member at a position spaced form the end of said member opposite said one end; and said engaging means is constructed and arranged to clamp said body.

4. In the combination of claim 3, wherein:

said tag yoke is offset, having a central portion normally generally parallel to said member and connected by a longer bar with said member and by a shorter bar with said body.

5. In the combination of an animal identification tag and a tool for installing the same in an ear or the like of an animal wherein:

said tool is provided with a blade having cutting edges at one end and a tag engaging element adjacent said cutting edges;

said tag is provided with a member adapted to be pulled by said tool through a slit in said ear or the like made by said cutting edges and then to engage the opposite side of said ear;

said member has adjacent one end thereof means for releasably receiving said tag engaging element;

said tag is provided with a body connected by a yoke to said member, a portion of said yoke remaining in said slit when said member engages the opposite side of said ear;

said body is provided with an outstanding neck and a lateral bar extending to each side of said neck for suspending an auxiliary tag from said body, said auxiliary tag having a hole for engaging said neck;

ssid tool is provided with means for clamping said body to hold said member along said tool blade for installation, including a clamping section of said tool resiliently engaging said blade at a position spaced from said cutting edges;

a post extends outwardly from said clamping section; and said post is provided in its outer end with a notch for receiving one side of said bar to hold said bar, whereby said auxiliary tag hole, while in engagement with said one side of said bar, may be pulled over the opposite side of said bar and onto said neck.

6. In the combination of an animal identification tag and a tool for installing the same in an ear or the like of an animal, wherein:

said tool is provided with a blade having cutting edges at one end and a tag engaging element adjacent said cutting edges;

said tag is provided with a member adapted to be pulled by said tool through a slit in said ear or the like made by said cutting edges and then to engage the opposite side of said ear;

said member has adjacent one end thereof means for releasably receiving said tag engaging element;

the opposite end of said blade is integral with a reversely curved rear end of said tool which provides a handle section which is then inclined toward said blade to provide a clamping section and then curves outwardly from said blade; and said tool is formed of resilient material, so as normally to hold said clamping section against said blade.

7. In the combination of claim 6, wherein:

the front end of said tool blade is offset downwardly and has a trough facing upwardly, with said cutting edges at each side of said trough and a forwardly slanting pin upstanding centrally of said trough for engagement with a transverse hole in said tag member.

8. An animal identification tag or connector for an auxiliary tag, comprising:

a blade member insertable form one end through a slit in an ear or the like of an animal;

a body spaced form said member and normally disposed generally parallel thereto;

a generally S-shaped yoke connecting said body and said member, said yoke having a central section disposed generally parallel to said member and connected by a longer arm with said member at a point spaced from the opposite end of said member, said longer arm having a length corresponding approximately to the thickness of said ear and said yoke being sufficiently flexible that said longer arm and a portion of said central section will pass through said slit, with said member, until said opposite end of said member has cleared the opposite side of said ear, with said longer arm remaining in said slit and extending substantially perpendicularly between said central section and said member, when said member moves back against said ear; and said central section of said yoke is connected to said body by a shorter arm and has a greater length than said shorter arm.

9. An animal identification tag, as defined in claim 8, wherein:

said yoke is generally flat and ribbon-like but having a width less than that of said blade member; and said central section of said yoke is connected with each of said longer arm and shorter arm by a rounded corner.

10. An animal identification tag, as defined in claim 8, wherein:

said one end of said blade member is generally flat, laterally tapered and provided with a transverse hole.

11. An animal identification tag, as defined in claim 10, wherein:

said body is generally flat but provided with a longitudinal reinforcing rib on the side facing said blade and a laterally enlarged section at the end corresponding to said one end of said member;

said blade member is generally flat but provided with a longitudinal reinforcing rib on the side facing said body and terminating at a position spaced from said one end, with at least one projection on each side adjacent said hole; and each of said body and blade member extend above said yoke a sufficient distance to clamp said ear between them, when the lower end of said body is moved outwardly away from said ear, said ribs providing sufficient rigidity for such clamping.

* * * * *

UNITED STATES PATENT OFFICE
CERTIFICATE OF CORRECTION

Patent No. 3,694,949  Dated October 3, 1972

Inventor(s) Clarence H. Howe

It is certified that error appears in the above-identified patent and that said Letters Patent are hereby corrected as shown below:

Column 1, line 22, "preferably" should read --preferable--.
Column 3, line 44, "for calves, sheep and" should read --such as larger sizes for--. Column 4, line 53, "projecting" should read --projection--. Column 9, line 39, Claim 8, "form" should read --from--; line 41, "form" should read --from Signed and sealed this 20th day of February 1973.

(SEAL)
Attest:

EDWARD M. FLETCHER, JR.
Attesting Officer

ROBERT GOTTSCHALK
Commissioner of Patents